United States Patent Office 3,784,584
Patented Jan. 8, 1974

3,784,584
METHYLOLGLYCIDYL ETHERS
Alfred Renner, Munchenstein, and Wolfgang Seiz, Basel, Switzerland, assignors to Ciba-Geigy Corporation, Ardsley, N.Y.
No Drawing. Filed Mar. 16, 1972, Ser. No. 235,386
Claims priority, application Switzerland, Mar. 26, 1971, 4,515/71
Int. Cl. C08g 45/06
U.S. Cl. 260—830 TW
10 Claims

ABSTRACT OF THE DISCLOSURE

New polyglycidyl ethers of Formula I:

(I)
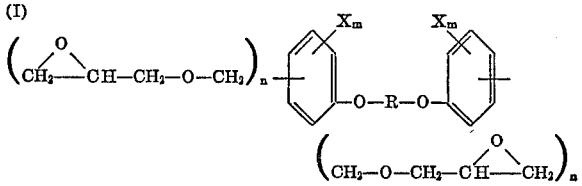

wherein R represents an alkylene or alkenylene group having a maximum mass of 2000 atomic weight units, and which can be interrupted by benzene nuclei and oxygen atoms, as well as carry halogen- or oxygen-containing substituents, X stands for an alkyl group having at most 12 carbon atoms, chlorine or bromine, $m$ stands for 0, 1 or 2, and $n$ stands for 1, 2 or 3, and their preparation are described. They can be cured with epoxide curing agents, and are used for the production of coatings, or as lacquer-, casting-, dipping- and impregnating-resins.

---

Polynuclear phenols, such as bisphenol A and novolaks, are the most frequently employed intermediates for the epoxide resins normally used at present in industry. Carbonyl compounds, e.g. acetone, cyclohexanone, formaldehyde, glyoxal or acrolein, serve to effect the linkage of phenols with retention of the hydroxyl group. By etherification of this group with epichlorhydrin, in the presence of sodium hydroxide solution, are obtained the aforementioned synthetic resins. These do not, however, always possess after their curing, in the case of certain applications, satisfactory properties; in particular when, applied in the form of coatings subjected to severe mechanical stresses or to strong chemicals they often prove to be insufficiently resistant.

From the industry concerned with processing such products there is a continual demand, with regard to liquid epoxide resins based on bisphenol-A, for an ever increasing degree of purity and an ever lower viscosity. The result of this has been that the resins offered today have perhaps a very high content of monomeric bisphenol-A-diglycidyl ether, and tend therefore to crystallize if stored at low temperature; and/or crystallization is promoted by the addition of fillers, pigments, etc. It is now the aim to reduce this tendency of the resin to crystalize by the use of suitable additives. The requirement to be met in the case of an additive inhibiting crystallize by the use of suitable additives. The requireventing crystallization of the resin, it leaves all other properties of the resin as far as possible unaffected.

Surprisingly, certain epoxide resins containing etherified phenol groups with glycidyloxymethyl groups exhibit this property; and, at the same time, the use of the said epoxide resins enables products to be produced having better mechanical properties; furthermore, the obtained products are also chemically more resistant.

The present invention thus relates to new epoxide resins of the formula:

(I)
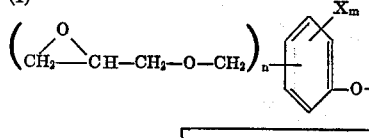
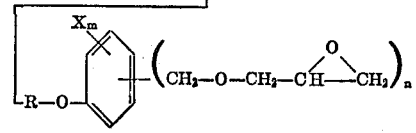

wherein

R represents an alkylene or alkenylene group having a maximum mass of 2000 atomic weight units, and which can be interrupted by benzene nuclei and oxygen atoms as well as carry halogen- or oxygen-containing substituents,
X stands for an alkyl group having at most 12 carbon atoms, chlorine or bromine,
$m$ stands for 0, 1 or 2, and
$n$ stands for 1, 2 or 3.

The compounds of Formula I are viscous, liquid or low-melting solid resins yellow to brown in color. A favorable feature distinguishing these compounds with regard to their processing is the negligible tendency to crystallize.

Preferred compounds of Formula I are compounds in which R represents an alkylene or alkenylene group having 2 to 6 carbon atoms, or the 2-glycidyloxypropylene-1,3-group or the bisphenol-A-group, $m$ stands for 0, and $n$ stands for 1, 2 or 3. Examples of the new compounds are:

(II)
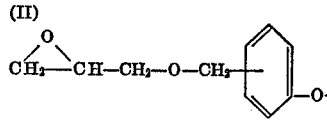
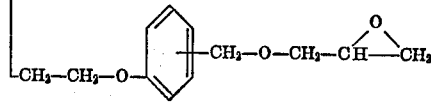

(III)
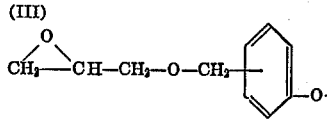
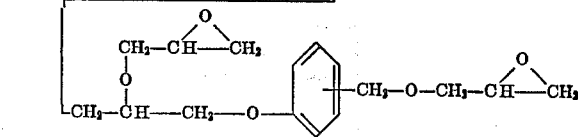

(IV)
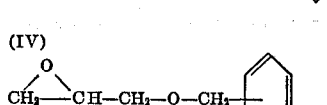
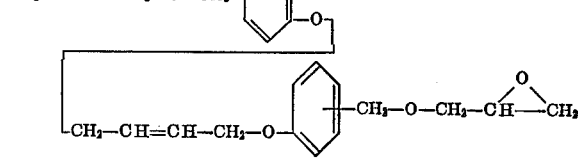

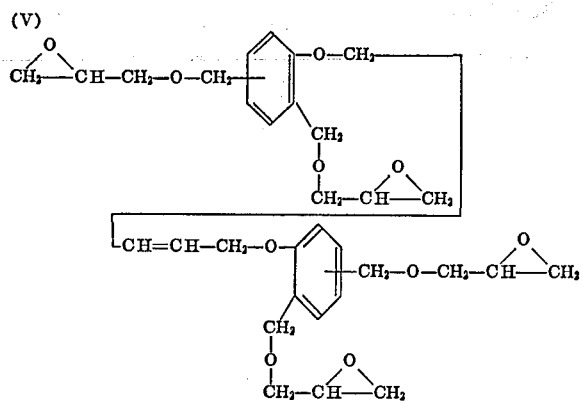
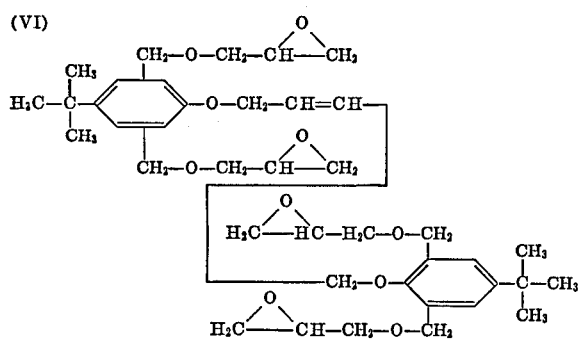
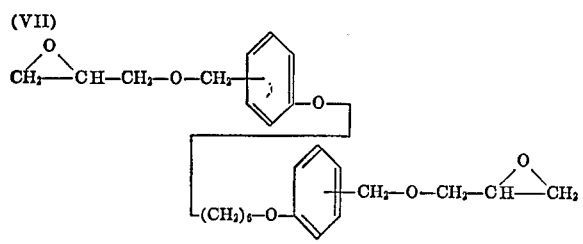
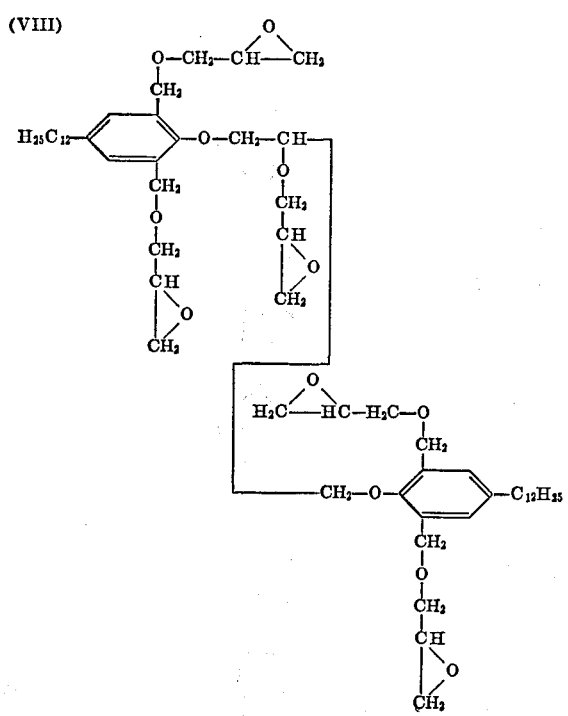

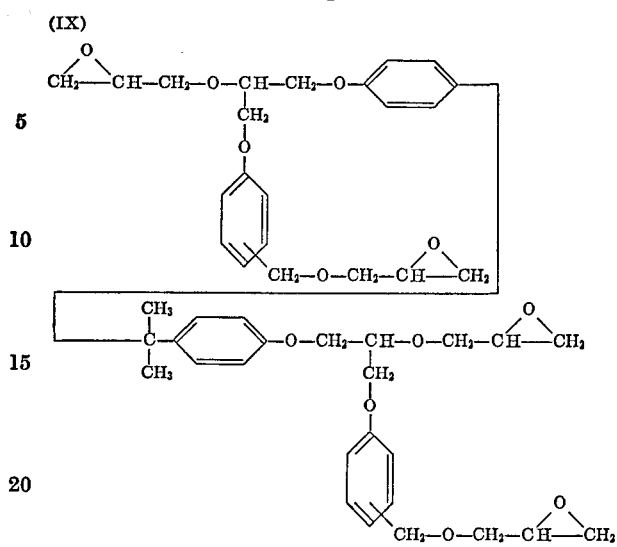

The new compounds are produced according to the invention by a process in which compounds of Formula I':

(I')   $(HOCH_2)_n\text{-}\!\!\bigcirc\!\!\text{-}O\text{-}R'\text{-}O\text{-}\!\!\bigcirc\!\!\text{-}(CH_2OH)_n$  with $X_m$ substituents wherein the group R' either has the meaning of R in Formula I or stands for a group convertible into R by glycidylation with epihalogenhydrin and elimination of hydrogen halide, and X, m and n have the same meanings as in Formula I, are reacted with epihalogenhydrin and hydrogen halide eliminated. Preferably, 2 to 5 moles of epichlorhydrin are used per hydroxyl group. Glycidylation is advantageously performed with azeotropic removal of the water in the presence of an HCl-acceptor, optionally in the presence of a catalyst. Suitable catalysts are quaternary ammonium halides such as, e.g. tetramethylammonium chloride, tetraethylammonium bromide, or benzyltrimethylammonium chloride.

Alkali hydroxide serves as the HCl-acceptor: most simply NaOH—in an equivalent amount or in a slight excess (5–20%). Higher excess amounts lead to saponification of epichlorhydrin, and to contamination of the reaction product by polyglycerin. Advantageously, the sodium hydroxide solution is added as concentrated aqueous solution during the azeotropic removal of water under reduced pressure; water serving as solvent for NaOH, together with that formed during the reaction, is removed in this manner continuously from the reaction mixture. The sodium chloride formed during the reaction is either washed out or removed by centrifuging, and the excess epichlorhydrin optionally distilled off in vacuo.

The starting compounds of Formula I can be obtained by reacting a phenol with 1–3 moles of formaldehyde in alkaline medium, the reaction being performed so carefully that the formation of polycondensation products is avoided to the greatest possible extent. The obtained Na-hydroxymethylphenolates, or mixtures thereof, are reacted with an organic dihalogen compound having the radical R of the above given definition. Optionally, the radical R can be formed in situ from preliminary products; suitable as radicals R are also epoxides, and particularly epichlorhydrin. Phenols usable in this process must have at least one free ortho- or para-position; advantageously, there are 2 free (2,4:2,6) or even 3 free (2, 4, 6) unsubstituted positions. Examples of applicable phenols are phenol, m-cresol, p-t-butylphenol, nonylphenol, dodecylphenol, 2-chlorophenol and 2,4-dibromophenol. The formaldehyde is advantageously used in the form of an aqueous 30 or 37 percent solution.

The alkali hydroxide best used is sodium hydroxide in concentrated aqueous solution. For the formation of the hydroxymethylphenol, the amount sufficing, in principle, is such that the pH-value can be adjusted at least to 8. For the subsequent reaction of the hydroxymethylphenol with the dihalogen compound, however, an equivalent amount of NaOH is necessary. The most simple procedure, therefore, is to apply this amount when the formaldehyde addition is made. This reaction is best performed in the temperature range of 20 to 100° C., preferably at 60° C. If no complete hydroxymethylation is attained, then, in general, mixtures of position-isomeric hydroxymethyl compounds are obtained.

Examples of suitable reagents for the bridging of the hydroxymethylphenols are: 1,2-dibromoethane, 1,6-dichloro-n-hexane, 1,4-dichlorobutene-2, $\alpha,\alpha'$-dichloro-p- or -m-xylene, $\alpha,\alpha',2,3,5,6$-hexachloro-p- or -m-xylene-2,2'-dichlorodiethyl ether, ethyleneglycol-di-2-chloroethylether, $\alpha,\omega$-Cl- or -Br terminated polyethylene or polypropylene oxides, glycerin-1,3-dichlorhydrin and epichlorhydrin.

For the "in situ" formation of the radical R, 2-valent phenols are particularly suitable, such as resorcin, bisphenol A and its tetrabromine derivative, in combination with epichlorhydrin.

The mentioned dihalogen compounds can in many cases be reacted with aqueous solutions of hydroxymethyl-Na-phenolates. For reasons of solubility, organic solvents are in some cases to be preferred, e.g. isopropanol or butanol.

The compounds of Formula I produced by the process according to the invention can be converted into the insoluble and unmeltable state by application of the usual curing agents, e.g. carboxylic acid anhydrides, compounds having several mobile hydrogen atoms, such as polyamines, polythiols, and polybasic acids, the conversion being optionally effected with the action of heat. Anionic polymerization catalysts too, e.g. $BF_3$ and its complexes, or cationic polymerization catalysts, e.g. tertiary amines, are suitable for producing and accelerating the curing process. The compounds according to the invention prove to be more reactive towards most of the stated curing agents than those epoxides which are glycidyl ethers of polyvalent phenols (resorcin, bisphenol A, novolaks). The high reactivity of the compounds according to the invention, combined with good flexibility, render them particularly suitable as lacquer resins, casting resins, dipping and impregnating resins. By virtue of their high reaction capacity, a high cross-linking density after curing can be obtained. For example, it is possible to produce with aliphatic or cycloaliphatic polyamines, coatings having excellent resistance to chemicals.

The polyvalency of many of the epoxide resins according to the invention also renders possible curing with only bifunctional curing agents. Examples of such curing agents are primary aliphatic monoamines such as butylamine, benzylamine or aniline, as well as compounds having two mercapto groups, such as ethanedithiol or 2,2'-dimercaptodiethyl ether. Where such compounds are used with, e.g. the diglycidyl ether of bisphenol A, only meltable soluble polyadducts are obtained.

To the epoxide resins can be added the usual additives such as active diluting agents for lowering the viscosity, extenders, fillers and toughening agents, also pigments, dyestuffs, softeners, flow control agents, thixotropic agents, fire-retarding materials. The present invention concerns, therefore, also curable mixtures for the production of moulded articles which contain the polyglycidyl ethers of Formula I according to the invention and curing agents for epoxide resins, as well as, optionally, other epoxides and additives of the above mentioned type.

Specially for application in the lacquer field, the new polyglycidyl ethers can moreover be partially or completely esterified, in a known manner, with carboxylic acids, such as, in particular, with higher unsaturated fatty acids. It is also possible to add to such lacquer-resin compositions other curable synthetic resins, e.g. phenoplasts or aminoplasts.

The curable mixtures according to the invention can be produced, in the usual manner, with the aid of known mixing aggregates (stirrer, kneader, rollers, etc.).

The curable epoxide resin mixtures according to the invention are used, in particular, in the field of surface protection, in electrical engineering, for laminating processes, and in the building industry. They can be used in the form best suited for the purpose for which they are required, e.g. in the unfilled or filled state, optionally in the form of solutions or emulsions, as coating agents, lacquers, as (whirl-) sinter powders, moulding materials, injection-moulding compositions, dip resins, casting resins, impregnating resins, bonding agents and adhesives, as tool resins, laminating resins, sealing materials and fillers, floor-covering materials, and bonding agents for mineral aggregates. Their use for surface protection and for casting resins is preferred.

Where not otherwise stated in the following examples, the term "parts" denotes parts by weight, and percentages are expressed in percent by weight. Parts by volume and parts by weight have the same ratio to each other as millimeter to gram.

EXAMPLE 1

Epoxide resin according to Formula III 188 parts of phenol are mixed with 210 parts of 30% aqueous formaldehyde solution; and 84 parts of 50% aqueous sodium hydroxide solution are added dropwise as the mixture is stirred. As soon as the temperature of the reaction mixture has reached 50° C., it is maintained at this point by external cooling. Two hours after completion of the addition of sodium hydroxide solution, the reaction mixture is heated to 90° C. and 102 parts of epichlorhydrin are added dropwise. In consequence of a slight exothermic reaction, the reaction mixture commences to boil and becomes cloudy. It is allowed to gently boil for one hour with reflux-cooling and with stirring.

A further 1387 parts of epichlorhydrin are afterwards added; distillation is thereupon performed through a water-separator which allows the separation of the specifically lighter phase (water) and the return of the heavier phase (epichlorhydrin). During the azeotropic removal of the water, the pressure is gradually reduced until a boiling temperature of 55° C. is established. 90 parts of water are separated and, with continuous azeotropic distillation at 50–55° C., additions are made dropwise of 15 parts of 50% aqueous tetramethylammonium chloride solution and 264 parts of 50% aqueous sodium hydroxide solution. On completion of the addition of sodium hydroxide solution, the water is removed completely from the mixture (total water separation: 420 parts by volume of water), the sodium chloride which has separated out is removed by filtration, and the reaction solution washed with 100 parts by volume of an aqueous solution containing 10% of monosodium phosphate. The excess epichlorhydrin is afterwards distilled off in a rotary evaporator at 120° C. and under 15 torr; and to clear the resin remaining behind it, is filtered, whilst still warm, over "Cellite." In this manner are obtained, in quantitative yield, 478 parts of a medium-viscous, pale yellow resin of which the details are as follows:

| | Found | Calculated |
|---|---|---|
| Epoxide content, equivalents per kilogram | 5.74 | 6.36 |
| Chlorine content, percent | 1.0 | 0 |
| Content of saponifiable chlorine, percent | 0.056 | 0 |
| Mean molecular weight | 526 | 472 |
| Viscosity at 25° C., cp | 8,000 | |
| Color number according to Gardner and Holdt | 4 | |

The resin is particularly suitable as a non-crystallizing casting resin and base resin for moulded articles, and also for the production of coatings resistant to chemicals.

EXAMPLE 2

Epoxide resin according to Formula IV 940 parts of phenol, 1100 parts of 30% aqueous formaldehyde solution and 800 parts of 50% aqueous sodium hydroxide solution are reacted, as described in the previous example, for 2 hours at 50° C. An addition is then made dropwise at 60° C., with stirring and external cooling, of 625 parts of 1,4-dichlorobutene-2; the reaction mixture is then allowed to react at this temperature for a further two hours. After cooling, a 3-phase system is obtained: oil phase, water phase and salt mass. The two lower phases are extracted twice with 925 parts of epichlorhydrin each time, and combined with the oil phase; to this are then added a further 2775 parts of epichlorhydrin.

Water is removed from the solution by azeotropic distillation through a phase-separating vessel under reduced pressure with the boiling temperature at 55° C.; additions are then made dropwise of 50 parts of a 50% aqueous solution of tetramethylammonium chloride and 880 parts of a 50% aqueous sodium hydroxide solution. After completion of the addition of sodium hydroxide solution, the azeotropic distillation is continued until the water is completely removed; the reaction solution is then cooled to room temperature, filtered off from the precipitated sodium chloride, and washed with 200 parts of a 100% solution of monosodium phosphate in water. After the epichlorhydrin has been distilled off at 120° C./15 torr in the rotary evaporator, there remain behind 1640 parts (79.6% of the theoretical amount) of a highly viscous, red-brown resin having the following characteristic values:

|  | Found | Calculated |
|---|---|---|
| Epoxide content, equivalents per kilogram | 4.62 | 4.85 |
| Chlorine content, percent | 1.09 | 0 |
| Amount of saponifiable chlorine, percent | 0.06 | 0 |
| Mean molecular weight | 432 | 412 |
| Viscosity at 25° C., cp | 172,000 |  |
| Color number according to Gardner and Holdt | 12 |  |

The obtained resin can be employed as mentioned in Example 1.

EXAMPLE 3

Epoxide resin according to Formula V

The procedure used is the same as that in Example 2, but instead of 1100 parts, 2000 parts of 30% aqueous formaldehyde solution are reacted with 940 parts of phenol and 800 parts of 50% aqueous sodium hydroxide solution.

After the reaction with dichlorobutene and with epichlorhydrin, 2295 parts (78.6% of the theoretical amount) of a yellow viscous resin are obtained having the following characteristic values:

|  | Found | Calculated |
|---|---|---|
| Epoxide content, equivalents per kilogram | 6.06 | 6.85 |
| Chlorine content, percent | 1.1 | 0 |
| Amount of saponifiable chlorine, percent | 0.08 | 0 |
| Mean molecular weight | 613 | 584 |
| Viscosity at 25° C., cp | 16,400 |  |
| Color number according to Gardner and Holdt | 5 |  |

The obtained resin can be employed as mentioned in Example 1.

EXAMPLE 4

Epoxide resin according to Formula VI

An amount of 300 parts of solid sodium hydroxide is dissolved in 5960 parts of water, and to this solution are then added, with stirring, 1125 parts of 4-t-butylphenol. An addition is made dropwise at 55–60° C., in the course of one hour, of 1237.5 parts of an aqueous 37% formaldehyde solution; the whole is then allowed to react further for 1 hour at 60° C. During this period, the color changes from the initial yellow-brown to orange and then to yellow-green. 468.75 parts of 1,4-dichlorobutene-2 are then added dropwise at 60° C. in the course of 45 minutes, and the reaction is allowed to continue at this temperature for 6 hours, in the process of which large amounts of the crystallized intermediate product are formed. The reaction solution is cooled to room temperature, the crystals are separated on the centrifuge, washed well with water and dried at 70° C. in vacuo. In this way are obtained 1765 parts (99.7% of the theoretical amount) of the tetramethylol compound, M.P. 170–171° C.

118.5 parts of this intermediate product are dissolved in the boiling heat in 925 parts of epichlorhydrin; to the solution are added 10 parts of a 50% aqueous solution of tetramethylammonium chloride; and the pressure is gradually reduced to the level where a boiling point of 80° C. is established. With simultaneous azeotropic water-separation, 88 parts of 50% aqueous sodium hydroxide solution are added dropwise; the reaction mixture is well separated from water, filtered, washed with $NaH_2PO_4$-solution, and excess epichlorhydrin removed in the rotary evaporator at 120° C. and 15 torr. Thus obtained in quantitative yield are 174 parts of a highly viscous, clear, dark-red resin having the following characteristic values:

|  | Found | Calculated |
|---|---|---|
| Epoxide content, equivalents per kilogram | 4.53 | 5.74 |
| Chlorine content, percent | 1.98 | 0 |
| Amount of saponifiable chlorine, percent | 0.23 | 0 |
| Mean molecular weight | 650 | 696 |
| Viscosity at 25° C., cp | 144,000 |  |
| Color number according to Gardner and Holdt | 14 |  |

The obtained resin can be employed as mentioned in Example 1.

EXAMPLE 5

Epoxide resin according to Formula VII 376 parts of phenol and 440 parts of 30% aqueous formaldehyde solution are prepared, and 320 parts of 50% sodium hydroxide solution are added dropwise. The temperature is allowed to rise to 60° C., and condensation performed for 2 hours at 60° C. An addition is then made of 310 parts of 1,6-dichlorohexane, and the whole heated to boiling for 20 hours. 1850 parts of epichlorhydrin are afterwards added, and 550 parts of water removed by azeotropic distillation at 90–95° C. The pressure is gradually reduced to 120 torr, and in this manner a boiling-temperature of 55–60° C. established. With continuous distillation through the phase-separating vessel, 20 parts of a 50% aqueous solution of tetramethylammonium chloride are added dropwise, and then likewise 352 parts of 50% aqueous sodium hydroxide solution. After processing in the manner described in the preceding examples, 177.1 parts of a resin are obtained having an epoxide content of 3.11 equivalents/kg., a viscosity of 140 cp. at 25° C., with a color number according to Gardner and Holdt of 4.

The obtained resin can be employed in the manner described in Example 1.

EXAMPLE 6

Epoxide resin according to Formula X:

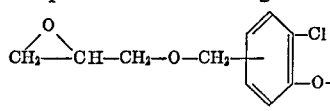
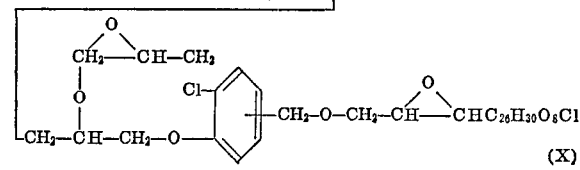

(X)

257 parts of O-chlorophenol are mixed with 210 parts of 30% aqueous formaldehyde solution, and to the mixture are added dropwise, with stirring, 84 parts of 50% aqueous sodium hydroxide solution. As soon as the reaction mixture has attained a temperature of 50° C., this temperature is maintained by external cooling. One hour after completion of the addition of sodium hydroxide solution, the temperature is raised quickly to 90° C. by heating, and 102 parts of epichlorhydrin are added dropwise. The reaction mixture commences to boil in consequence of a slight exothermic reaction. After the addition of epichlorhydrin has been made, the reaction mixture is allowed to gently boil, with reflux cooling and stirring, for a further hour.

A further 1387 parts of epichlorhydrin and 15 parts of 50% aqueous tetramethylammonium chloride solution are afterwards added; distillation is thereupon performed through a water-separator which allows the separation of the specifically lighter phase (water) and the return of the heavier phase (epichlorhydrin). The pressure is reduced to obtain for the azeotropic removal of water a boiling temperature of 50–55° C. After 30 minutes of circulation distillation, 187 parts by volume of water are separated and, with continuous azeotropic distillation at 50–55° C. boiling temperature, the addition is made dropwise, in the course of 2 hours, of 264 parts of 50% aqueous sodium hydroxide solution. After completion of the addition of sodium hydroxide solution, water is removed entirely from the mixture (total water separation: 367 parts by volume); the sodium chloride which has separated out is removed by filtration, and the reaction solution washed with 100 parts by volume of a 10% aqueous mono-sodium phosphate solution. The excess epichlorhydrin is subsequently distilled off in a rotary evaporator at 120° C. and 20 torr, and the resin remaining behind filtered, whilst still warm, through "Cellite" in order to clear the resin. In this manner are obtained 482 parts of a medium-viscous, light-brown resin having the following characteristic values:

|  | Found | Calculated |
|---|---|---|
| Epoxide content, equiv./kg | 4.87 | 5.55 |
| Chlorine content, percent | 13.44 | 13.11 |
| Content of saponifiable chlorine, percent | 0.06 | |
| Viscosity at 25° C., cp | 43,800 | |
| Color number according to Gardner and Holdt | 7 | |

EXAMPLE 7

Epoxide resin according to the following structural Formula XI:

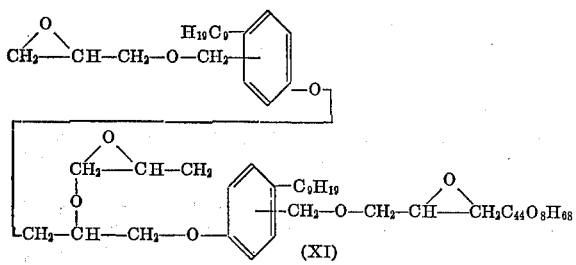

(XI)

440 parts of nonylphenol, 210 parts of 30% aqueous formaldehyde solution and 84 parts of 50% aqueous sodium hydroxide solution are reacted, as described in Example 1, at a reaction temperature of 50° C. The reaction mixture is subsequently held for a further 3 hours at 50° C.; the temperature is then raised to 90° C., and during a quarter of an hour an addition is made dropwise, with removal of the heating bath, of 102 parts of epichlorhydrin. The reaction mixture is then allowed to gently boil, with reflux cooling and stirring, for a further three-quarters of an hour; a further 1387 parts of epichlorhydrin and 15 parts of an aqueous 50% tetramethyl-ammonium chloride solution are thereupon added to the mixture.

With a boiling temperature of 50–55° C. and during azeotropic distillation through a phase-separating vessel, as described in detail in the preceding examples, 264 parts of an aqueous 50% sodium hydroxide solution are added. The water was removed entirely from the mixture (total amount of water separated: 350 parts).

Subsequent processing as already described in the preceding examples yielded 685 parts of medium-viscous resin having the following characteristic values:

|  | Found | Calculated |
|---|---|---|
| Epoxide content, equiv./kg | 3.07 | 4.14 |
| Chlorine content, percent | 0.45 | |
| Content of saponifiable chlorine, percent | 0.12 | |
| Viscosity at 25° C., cp | 38,800 | |
| Color number according to Gardner and Holdt | 5 | |

EXAMPLE 8

Epoxide resin according to Formula IX 188 parts of phenol, 210 parts of 30% aqueous formaldehyde solution and 164 parts of 50% aqueous sodium hydroxide solution are reacted, as described in the preceding examples, at a reaction temperature of 50° C. To the reaction mixture are then added 228 parts of bisphenol A; the reaction temperature is afterwards raised to 90° C., and an addition then made dropwise during one hour, with removal of the heating bath, of 194 parts of epichlorhydrin. A slight exothermic reaction results in the reaction mixture commencing to boil, and during the time of the dropwise addition it becomes increasingly more viscous. The reaction is allowed to continue for a further hour at 90° C.; a further 1850 parts of epichlorhydrin are then added, and the water present is removed by azeotropic distillation at a boiling temperature of 50–55° C. With continuous distillation through a phase-separating vessel, additions are made dropwise, under constant conditions, of 20 parts of a 50% aqueous tetramethylammonium chloride solution, and then of 352 parts of a 50% aqueous sodium hydroxide solution. After processing as described in the preceding examples, 812 parts of a highly viscous resin are obtained having the following characteristic values:

|  | Found | Calculated |
|---|---|---|
| Epoxide content, equiv./kg | 4.12 | 4.92 |
| Chlorine content, percent | 0.4 | |
| Saponifiable chlorine, percent | 0.164 | |
| Viscosity at 25° C., cp | >100,000 | |
| Mean molecular weight | 871 | |
| Color number according to Gardner and Holdt | 3 | |

EXAMPLE 9

Epoxide resin of the following structural Formula XII

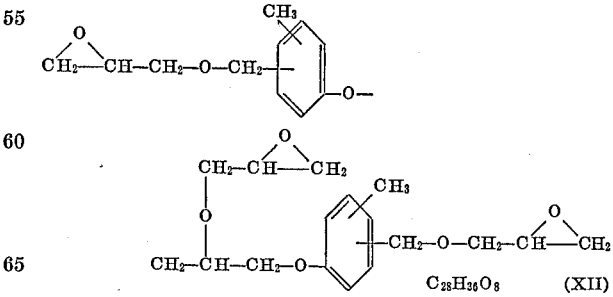

$C_{28}H_{36}O_8$ (XII)

530 parts of a commercial mixture cresol isomers are mixed with 450 parts of 30% aqueous formaldehyde solution. An addition is made dropwise, with stirring, of 200 parts of 50% aqueous sodium hydroxide solution, the procedure being such that, by application of external cooling, the temperature of the reaction mixture does not exceed 50° C. Stirring of the reaction mixture continues at room temperature overnight; the mixture is subsequently heated to 60° C., and an addition is made dropwise at this temperature of 232 parts of epichlorhydrin. The reaction mixture is held, with continued stirring, for a further 2 hours at 60° C. A further 1525 parts of epichlorhydrin and 500 parts of water (50–60° C.) are afterwards added; the whole is thoroughly stirred, and the lower organic phase separated in a separating funnel. After the addition of 13.3 parts of a 50% aqueous tetramethylammonium chloride solution at a boiling temperature of 50–55° C., and with azeotropic distillation through a phase-separating vessel, as described in detail in the preceding examples, 480 parts of an aqueous 50% sodium hydroxide solution are added. The complete removal of water is then effected (total amount of water separated: 360 parts). The mode of processing already repeatedly described yielded 1017 parts of dark-brown viscous resin having the following characteristic values:

are homogeneously mixed with 33 parts of the curing agent HY 837 described in Example A. The viscosity of this mixture at 20° C. is ca. 40,000 cp. If this mixture is applied with a dry film thickness of 160–180μ, then it requires ca. 4 hours for complete curing at 20° C. and with a relative humidity of 65%. Under these conditions, the pendulum hardness after 24 hours is 165″ (Persoz); and after one month the cupping-value (Erichsen) is 5 mm. After one month's ageing at 60° C., the Erichsen value is still 1 mm. In the impact test, a value of 60 cm./kg. is obtained after an ageing treatment of 1 month at 20° C. and 1 month at 60° C.

A film applied on this basis exhibits, after 10 days' curing at 20° C., resistance to hot water, dilute inorganic acids, aqueous neutral and alkaline solutions, as well as to aliphatic and aromatic hydrocarbons.

TABLE 1

[Casting test: The described methylolglycidyl ethers are well mixed with the amounts (given in the following table) of phthalic acid anhydride or with an adduct of 1 mole of triethylenetetramine and 2 moles of propylene oxide. The mixtures are poured into aluminum moulds (10 x 44 x 133 mm.) and cured at 120° C. and 40° C. The properties of the cast specimens are shown in the following table]

| Application Ex. No. | 100 g. of methylol- glycidyl ether according to Ex. No. | Grams of amine curing agent per 100 g. of methyl- olglycidyl ether | Phthalic acid anhydride per 100 g. of methyl- olglycidyl ether | Flexural strength, VSM 77103, kg./mm.² | Impact strength, VSM 77105, cm. kg./cm.² | Mechanical dimensional stability in the heat according to Martens DIN 53 458 in, ° C. | Water absorption after 1 hour 100° C. (percent) |
|---|---|---|---|---|---|---|---|
| C | 1 | | 74 | 13.4 | 4.8 | 80 | 0.60 |
|   |   | 11 |    | 13.3 | 9.1 | 57 | 2.1 |
| D | 2 |    | 57 | 6.4  | 4.8 | 45 | 0.44 |
|   |   | 17.4 |  |      |     | Flexible | 1.92 |
| E | 3 |    | 67 | 17.0 | 6.9 | 62 | 0.48 |
|   |   | 18 |    | 13.8 | 6.8 | 47 | 3.30 |
| F | 4 |    | 57 | 15.2 | 9.3 | 111 | 0.24 |
|   |   | (¹) |   |      |     |     |     |
| G | 6 |    | 60 | 10.5 | 3.0 | 92 | 0.5 |
|   |   | 18.4 |  | 15.7 | 7.9 | 61 | 1.06 |
| H | 7 |    | 40 | 9.7  | 4.7 | 47 | 0.44 |
|   |   | 11.8 |  |      | 3.25 | 40 | 1.36 |
| I | 8 |    | 52 | 7.2  | 5.3 | 103 | 0.32 |
| K | 9 |    | 66 | 11.6 | 3.6 | 90 | 0.32 |
|   |   | 19.6 |  | 10.7 | 2.9 | 60 | 2.03 |

¹ Too reactive.

|  | Found | Calculated |
|---|---|---|
| Epoxide content, equiv./kg. | 4.5 | 6.0 |
| Chlorine content, percent. | 0.4 | |
| Content of saponifiable chlorine, percent | 0.14 | |
| Viscosity at 25° C., cp. | 262,000 | |
| Color number (G. plus H.) | 13 | |

COATING TESTS

Application Example A 100 parts of the epoxide resin described in Example 1 are homogeneously mixed with 39 parts of a curing agent consisting of a phenol-accelerated adduct of trimethyl-hexamethylene diamine and a liquid epoxide resin based on bisphenol A and epichlorhydrin. This mixture has a viscosity at 25° C. of ca. 6000 cp. Coatings produced with this mixture and having a dry film thickness of 160–180μ display a light-yellow inherent color. Coatings having this layer-thickness require, at a temperature of 20° C. and with relative humidity of 65%, about 4 hours to become fully cured. After 24 hours under these conditions, the pendulum hardness according to Persoz is 207″, and, after one month, a cupping value according to Erichsen of 5 mm. is measured. After one month's ageing at 60° C., the Erichsen value is still 3 mm.

After ageing of 1 month/20° C. and 1 month/60° C., the values in the impact test are 50 cm./kg. The mandrel-bending test with the 15 mm. mandrel gives, with constant ageing times and curing temperatures, a value of 120°◁.

Films applied on this basis exhibit, after 10 days' curing at 20° C., resistance to hot water, dilute inorganic acids, aqueous neutral and alkaline solutions, as well as to aliphatic and aromatic hydrocarbons.

Application Example B 100 parts of the epoxide resin described in Example 6

CRYSTALLIZATION-INHIBITING PROPERTIES

Examples L and M

To 40 parts of resin of Formula III and to 40 parts of resin of Formula XIII

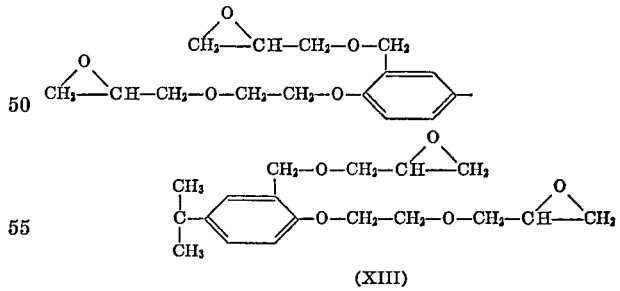

(XIII)

are added in each case 60 parts of liquid epoxide resin based on bisphenol A (epoxide-group content 5.4 equiv./kg., viscosity 11500 cp. at 25° C).

The thus prepared resin mixtures L (with resin of Formula III) and M (with resin of Formula XIII) are tested against the unmodified liquid base resin based on bisphenol A alone, the test procedures being as follows:

(a) Determination of crystallization tendency (cp. Table 2): For this test an amount of 90 g. of the resin or resin mixtures is diluted with 10 g. of butylglycidyl ether; the whole is cooled to +10° C., inoculated at this temperature with 1.5 g. of pure crystalline bisphenol-A-diglycidyl ether, and stored at this temperature in a wide-necked screw-cover flask. The time required for complete solidification of the specimen is measured.

(b) Curing with aliphatic polyamine (cp. Table 3): The resin to be tested is mixed at room temperature with the stoichiometric amount of triethylenetetramine. On one portion of this mixture the time is measured, as a measure of the reactivity, in which, under isothermal conditions at 40° C., the viscosity increases to 3000 cp. (Hoeppler falling ball test viscosimeter). This time is denoted as the pot life at 40° C. The remainder of the mixture is poured into metal moulds preheated to 40° C. to obtain plates of dimensions 130 x 130 x 4 mm. and test specimens of dimensions 120 x 15 x 10 mm., the mixture being then cured in these moulds during 24 hours at 40° C. After cooling, the thus prepared moulded plates and bars are removed from the moulds, and used for the preparation of test specimens for the determination of the properties listed in the following table.

(c) Curing with cycloaliphatic polyamine: The resin to be tested is again mixed at room temperature with the stoichiometric amount of cycloaliphatic polyamine known under the designation of "Laromin C 260" (manufacturer BASF). The procedure then followed is as described under (a), except that there is a subsequent curing, after the curing at 40° C., for 6 hours at 100° C.

(d) Curing with hexahydrophthalic acid anhydride (cp. Table 5): The resin to be cured is heated to ca. 80° C.; to it is then added the stoichiometric amount of hexahydrophthalic acid anhydride and 1 phr. tert. amine as a curing accelerator then added. On a portion of the mixture is measured the time, under isothermal conditions, required for the viscosity to attain a value of 1500 cp. at 80° C. (Hoeppler falling ball viscosimeter) (pot life at 80° C.). The remainder of the mixture, as mentioned above, is poured into metal moulds, the mixing being cured in this case, however, for 4 hours at 80° C. and afterwards for 6 hours at 120° C.

The properties of the moulded materials produced according to (b), (c) and (d) are given, together with the results of the pot life measurements, in Tables 2 to 5.

These results show that, in spite of the high addition amounts, the properties have only been slightly changed compared with those in the case of the unmodified epoxide resin. The result of the crystallization test shows that the mixtures obtained with the methylol epoxides according to the invention can no longer, under practical conditions, be caused to crystallize.

TABLE 2

Crystallization tendency

| Resin or resin mixture: | Crystallization time in days |
|---|---|
| Liquid bisphenol-A-epoxide resin | 3–5 |
| L | >250 |
| M | >250 |

TABLE 3.—CURING WITH ALIPHATIC POLYAMINE

| Resin or resin mixture | 100 parts of liquid bisphenol-A-epoxide resin | 100 parts L | 100 parts M |
|---|---|---|---|
| Triethylenetetramine, parts | 12.9 | 13.5 | 13.6 |
| Pot life at 40° C. up to 3,000 cp | 20' | 27' | 19' |
| Curing | 24 h, 40° | 24 h, 40° | 24 h, 40° |
| Impact strength (cm. kg./cm.²) | 21.3 | 21.4 | 34.8 |
| Flexural strength | 14.8 | 14.3 | 13.6 |
| Deflection (mm.) | 8.3 | 7.4 | 8.6 |
| Martens DIN (° C.) | 65 | 63 | 64 |
| Tensile shearing strength on Anticorodal R (kg./mm.²) | 0.21 | 0.48 | 0.36 |

TABLE 4.—CURING WITH CYCLOALIPHATIC POLYAMINE

| Resin or resin mixture | 100 parts of liquid bisphenol-A-epoxide resin | 100 parts L | 100 parts M |
|---|---|---|---|
| Laromin C-260 | 31.8 | 33.0 | 36.0 |
| Pot life at 40° C. up to 3,000 cp | 1 h, 01' | 1 h, 30' | 49' |
| Curing | 24 h., 40° plus 6 h., 100° | | |
| Impact strength (cm. kg./cm.²) | 29.8 | 18.9 | 28.3 |
| Flexural strength (kg./mm.²) | 15.1 | 13.5 | 15.0 |
| Deflection (mm.) | 11.1 | 9.4 | 11.2 |
| Martens DIN (° C.) | 109 | 103 | 108 |

TABLE 5.—CURING WITH HEXAHYDROPHTHALIC ACID ANHYDRIDE

| Resin or resin mixture | 100 parts of liquid bisphenol-A-epoxide resin | 100 parts L | 100 parts M |
|---|---|---|---|
| Hexahydrophthalic acid anhydride 0.95 mol of anhydride per epoxide, parts | 77.5 | 81 | 82 |
| Tert. amine, part | 1 | 1 | 1 |
| Pot life at 80° C. up to 1,500 cp | 1 h, 23' | 1 h., 10' | 1 h., 45' |
| Curing | 4 h., 80° plus 6 h., 120° | | |
| Impact strength (cm. kg./cm.²) | 14.1 | 18.3 | 19.2 |
| Flexural strength (kg./mm.²) | 15.1 | 15.0 | 15.8 |
| Deflection (mm.) | 9.1 | 7.2 | 7.4 |
| Martens DIN (° C.) | 118 | 104 | 112 |
| H₂O-absorption after 4 days (R.T.) percent | 0.23 | 0.23 | 0.31 |
| Loss factor: | | | |
| tan δ >1% above | 120° | 105° | 115° |
| tan δ >5% above | 132° | 122° | 131° |
| $E_r$ at 25° C | 3.5 | 3.5 | 3.7 |
| Spec. insulation resistance at 25° (Ωcm.) | $4 \cdot 10^{16}$ | $9 \cdot 10^{16}$ | $1 \cdot 10^{17}$ |

I claim:
1. New polyglycidyl ethers of the Formula I:

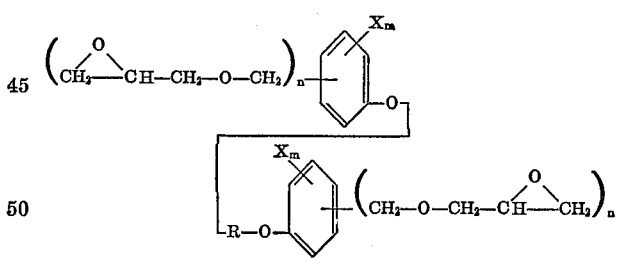

wherein

R denotes an alkylene or alkenylene group having a maximum mass of 2000 atomic weight units, and which can be interrupted by benzene nuclei and oxygen atoms as well as carry halogen or glycidyl ether containing substituents, X stands for an alkyl group having at most 12 carbon atoms, chlorine or bromine, m stands for 0, 1 or 2, and n stands for 1, 2 or 3.

2. Polyglycidyl ethers as claimed in claim 1 of the Formula I, wherein R denotes an alkylene or alkenylene group having 2 to 6 carbon atoms, and m stands for 0, and n for 1, 2 or 3.

3. Polyglycidyl ethers as claimed in claim 1 of the Formula I, wherein R denotes the glycidyloxypropylene-1,3-group, and m stands for 0, and n for 1, 2 or 3.

4. Polyglycidyl ethers as claimed in claim 1 of the Formula I, wherein R denotes the bisphenol-A group, m stands for 0, and n for 1, 2 or 3.

5. The compound as claimed in claim 1 of the Formula III:

(III)
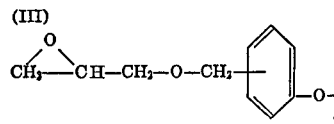
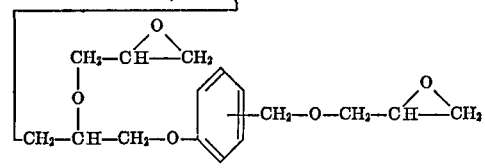

6. The compound as claimed in claim 1 of the Formula IV:

(IV)
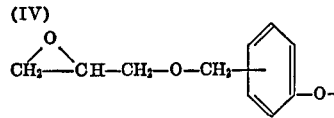

7. The compound as claimed in claim 1 of the Formula V:

(V)
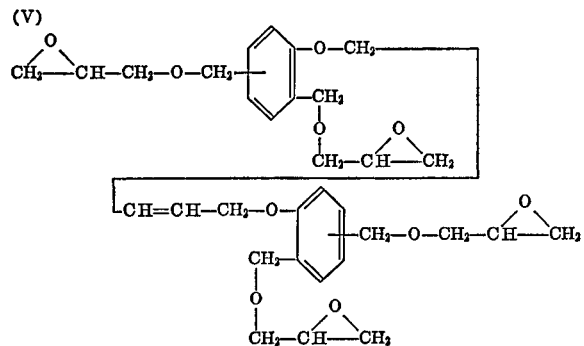

8. The compound as claimed in claim 1 of the Formula IX:

(IX)
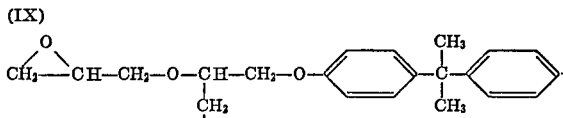
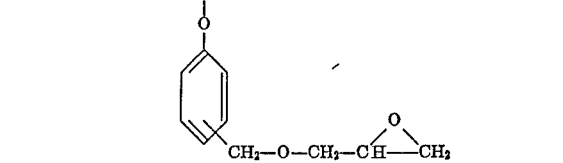
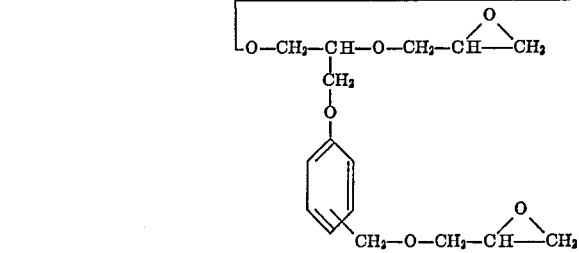

9. An epoxy resin composition comprising a polyglycidyl ether according to claim 1 and a sufficient amount of curing agent to cure said polyglycidyl ether.

10. An epoxy resin composition comprising the polyglycidyl ether, an epoxy resin curing agent of claim 9 and an epoxy resin based on bisphenol-A and epichlorhydrin.

References Cited
UNITED STATES PATENTS 2,579,329  12/1951  Martin _____ 260—51 X
3,514,418  5/1970  Schwarzer _____ 260—51 X WILLIAM H. SHORT, Primary Examiner T. E. PERTILLA, Assistant Examiner U.S. Cl. X.R.

117—161 ZB; 260—47 Ep, 53 Ep, 59, 348 C